(12) United States Patent
Pahl

(10) Patent No.: US 12,254,287 B1
(45) Date of Patent: Mar. 18, 2025

(54) RANDOM DATA GENERATION SYSTEM AND METHOD

(71) Applicant: Bespin Engineering, LLC, Alpharetta, GA (US)

(72) Inventor: Anthony J Pahl, Roswell, GA (US)

(73) Assignee: Bespin Engineering, LLC, Alpharetta, GA (US)

( * ) Notice: Subject to any disclaimer, the term of this patent is extended or adjusted under 35 U.S.C. 154(b) by 0 days.

(21) Appl. No.: 18/821,329

(22) Filed: Aug. 30, 2024

(51) Int. Cl.
 *G06F 7/58* (2006.01)
(52) U.S. Cl.
 CPC ..................... *G06F 7/58* (2013.01)
(58) Field of Classification Search
 CPC .............................................. G06F 7/58
 See application file for complete search history.

(56) References Cited

U.S. PATENT DOCUMENTS 11,621,996 B2    4/2023   Potlapally et al.
2013/0110895 A1*  5/2013  Valentino ............... G09B 19/00
                                                           708/255

FOREIGN PATENT DOCUMENTS

CN         114138657 A      3/2022

OTHER PUBLICATIONS

Title: Datagen—Data Generator tool built for CDP; Dated: Apr. 18, 2024 Link:https://community.cloudera.com/t5/Community-Articles/Datagen-Data-Generator-tool-built-for-CDP/ta-p/357561.
Brand: Restdb.io; Title:"Generating good test data" Link:https://restdb.io/docs/random-data-generator].
Brand:Amazon; Title:"Amazon Kinesis Data Generator" Link: https://awslabs.github.io/amazon-kinesis-data-generator/web/help.html.
FireflyMigration; Title:"Random Data Generator"; Dated: Jun. 9, 2017 Link:https://www.youtube.com/watch?v=6GFs80Crwxc].

* cited by examiner

*Primary Examiner* — Michael D. Yaary
(74) *Attorney, Agent, or Firm* — Briggs Intellectual Property Law; Jeremy A. Briggs

(57) ABSTRACT

A random data generation system having a transceiver and a processor is disclosed. The transceiver receives user defined attributes via a user interface of a user device. The user defined attributes include configuration information and workload information associated with a workload model. The configuration information includes information associated with an external system. The workload information includes information associated with a random data to be transmitted to the external system, and a first frequency at which the random data is to be transmitted during peak time duration and a second frequency at which the random data is to be transmitted during non-peak time duration. The processor may render the user interface, and obtain the user defined attributes. The processor may generate the random data, and transmit the random data to the external system based on the user defined attributes.

20 Claims, 6 Drawing Sheets

Redpanda

- Overview
- Topics
- Schema Registry
- Consumer groups
- Security
- Redpanda Connect
- Reassign Partitions Cluster > Topics > SDG.FINANCE

| 5.09 kiB | 23 | delete | 7 days | Infinite |
|---|---|---|---|---|
| Size | Messages | cleanup.policy | retention.ms | retention.bytes |

Messages  Consumers  Partitions  Configuration  ACL

PARTITION  START OFFSET  MAX RESULTS  FILTER
All ▽        Newest - 50 ▽    50 ▽

TIMESTAMP △   Key △   Value   ⊕ Preview △

☐ 7/7/2024 8:31:41 PM   ▽ { 5 items
　　　　　　　　　　　　"address" : "751 Gabriele Burg, Port
　　　　　　　　　　　　Kenethbury, WI 19139"
　　　　　　　　　　　　"name" : "Jeffery Becker"
　　　　　　　　　　　　"location" : "0K"
　　　　　　　　　　　　"eai" : 587550
　　　　　　　　　　　　"record_creation_time" : 1720398701398
　　　　　　　　　　　　}

⊞ 7/7/2024 8:31:42 PM   { "address":"Apt. 130 114 Allyson Land, ...

10 / page ▽                                                    1 ▽

FIG. 3

```
14 workloads:
15   - workloadName: dda_customer
16     topicName: SDG.FINANCE
17     workloadThreads: 1
18     workloadSleep: 1000
19     peakTime:
20     purgeOnStart: false
21     numPartitions: 1
22     replications: 1
23     backendBulkQueueDepth: 0
24     fields:
25       - name: eai
26         type: double
27         range: 0, 3300000
28       - name: name
29         type: full_name
30       - name: location
31         type: state
32       - name: address
33         type: full_address
34   - workloadName: dda_customer2
35     topicName: SDG.FINANCE2
36     workloadThreads: 2
37     workloadSleep: 1000
38     peakTime:
39     purgeOnStart: false
40     numPartitions: 1
41     replications: 1
42     backendBulkQueueDepth: 0
43     fields:
44       - name: eai
45         type: double
46         range: 0, 3300000
47         primary_key: true
48       - name: support_type
49         type: random_string_from_list
50         Card-Reissue, Check-Balance,
```

FIG. 4

Redpanda

- Overview
- Topics
- Schema Registry
- Consumer groups
- Security
- Redpanda Connect
- Reassign Partitions Cluster > Topics ⊙ ○

| 2 | 2 | 2 |
|---|---|---|
| Total topics | Total partitions | Total replicas |

🔍 *Enter search term/regex*

Create topic

| NAME △ | PARTITIONS △ | REPLICAS △ | CLEANUPPOLICY △ |
|---|---|---|---|
| SDG.FINANCE | 1 | 1 | delete |
| SDG.FINANCE2 | 1 | 1 | delete |

50 / page ⌄    1 ⌃

RANDOM DATA GENERATION SYSTEM AND METHOD

FIELD

The present disclosure relates to random data generation system and method that generates random data based on user defined attributes.

BACKGROUND

It is known that random data serve as a basis for numerous applications in data science. For instance, the random data may be required for simulation and modeling, statistical modeling, training purposes, and/or the like. There exist random data generators that are configured to generate random data. The random data generators mimic the structure of real data. For example, the random data generators may generate random email addresses, random names, random location addresses, random numbers, random phone numbers, random dates, and/or the like.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 depicts a snapshot of random data received by an external system in accordance with the present disclosure.

FIG. 4 depicts an example first workload information and second workload information in accordance with the present disclosure.

FIG. 5 depicts a snapshot of a list of multiple workloads received by an external system in accordance with the present disclosure.

DETAILED DESCRIPTION

Overview

Figure 1:
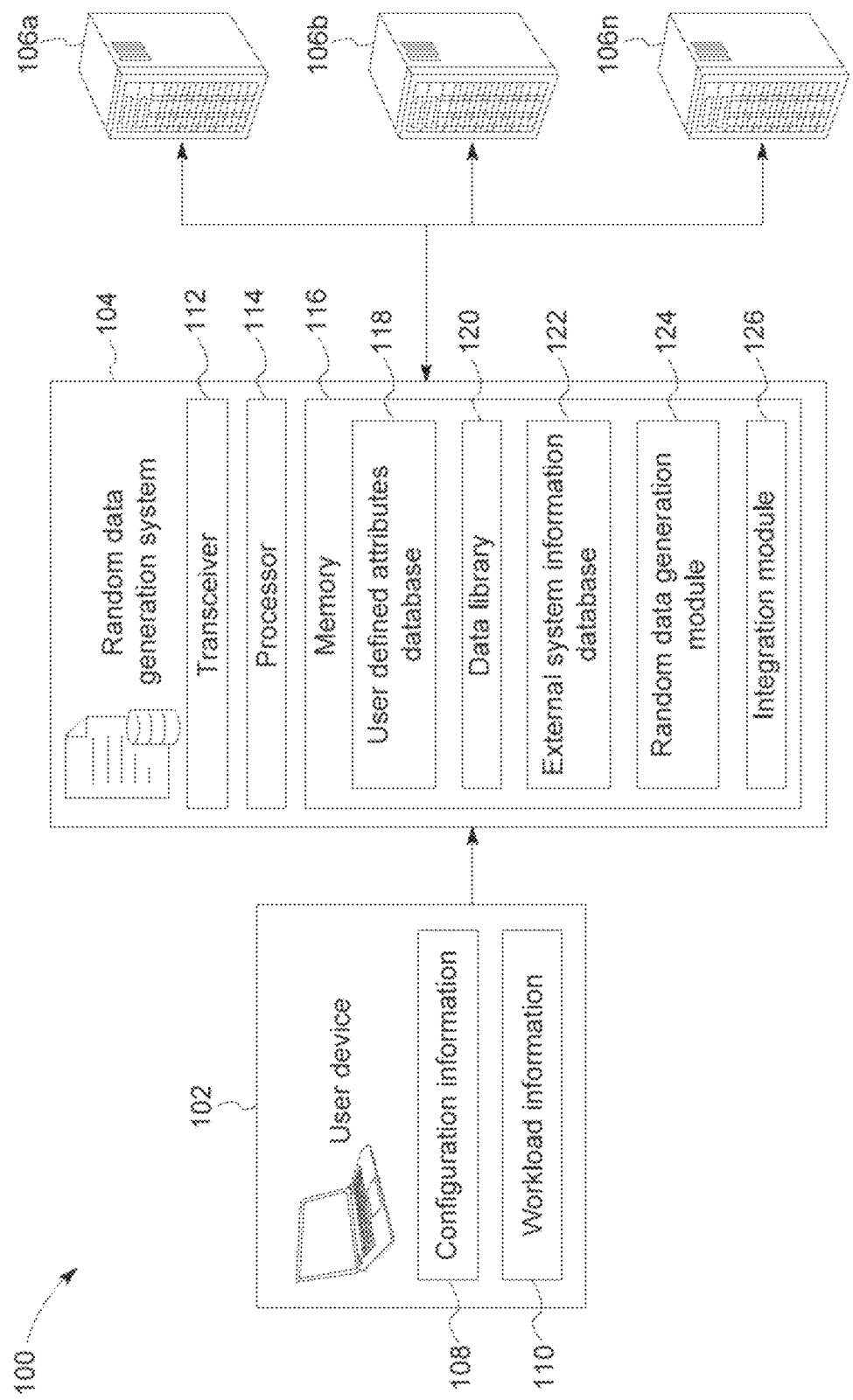
FIG. 1 depicts a system to generate random data in accordance with the present disclosure.

The present disclosure describes a random data generation system ("system") that may be configured to generate random data based on user defined attributes. The system may generate customized random data based on the user's requirement. For example, the system may generate random numbers that may be useful in financial industry/domain, or generate random names and addresses for testing in another industry type/domain. Thus, the system enables the user to control the data type and the associated parameters to generate the random data.

The system may be further configured to transmit the generated random data to an external system for simulation, modeling, training purposes, and/or the like. The external system may be a database (e.g., MongoDB, ClickHouse, Elasticsearch), Message Queue (Kafka, Red Panda, Redis, ActiveMQ, RabbitMQ), Web Service, file (e.g., CSV, PIPE, JSON), and/or the like. The system may be integrated with any external system. The user may provide information associated with the target integration (e.g., the information associated with the external system that may receive the random data from the system). The user may provide such information as part of the user defined attributes. The user may provide such information as "configuration information". The system may integrate with the external system that may be selected by the user (or the external system indicated in the configuration information). In an exemplary aspect, the configuration information may include information such as an external system identifier and/or an external system Internet Protocol (IP) address associated with the external system that may receive the random data from the system.

In some aspects, the user may control the delivery of the random data from the system to the external system. For instance, the user may control the random data delivery by providing a "workload information" as part of the user defined attributes. In some aspects, the workload information may include a frequency at which the random data should be transmitted to the external system. For example, the user may indicate in the workload information that the random data should be transmitted from the system to the external system every 1000 milliseconds (as the frequency information).

In further aspects, the workload information may include information associated with a "peak time" at which more random data may be transmitted to the external system or the random data may be transmitted more frequently to the external system. To transmit more data during the "peak time", the system may ramp up the frequency of random data transmission.

In additional aspects, the system may enable the user to define a first frequency at which the system should transmit the random data during the "peak time", and a second frequency at which the system should transmit the random data during a "non-peak time". In further aspects, the workload information may include one or more data fields that should be part of the transmitted random data. Examples of such data fields include, but are not limited to, a random first name, a random last name, a random full name, a random location address, a random number, or a combination thereof, and/or the like. In addition, the workload information may include information associated with one or more threads that may be executed simultaneously to generate the random data.

The system may be further configured to execute multiple workload models simultaneously, which may generate different random data for the same external system. In this case, the system may receive the workload information described above (associated with a first workload model) and additional workload information (associated with a second workload model) from the user via the user device. The different workload models may have different parameters (e.g., different frequencies) and/or different data fields. The system may generate different random data for different workload model, and may transmit the generated random data to the same external system based on respective workload parameters. The different workload models may be saved in different data structures in the external system. In some aspects, the system may build the data structure(s) on the external system, and may cause the external system to store the random data in respective data structures.

In further aspects, the system may be configured to obtain another configuration information from the user when the user desires to transmit the random data to another external system. The other configuration information may be part of the user defined attributes, and may include information associated with the other external system. In such scenarios, the user may or may not update/change the workload information associated with a previous configuration information provided by the user.

The present disclosure discloses a system and method that may assist a user to generate random data that may be customized for different industrial applications. In addition, the system may be easily integrated with different external systems (e.g., by updating the configuration information such as the external system identifier, the external system IP address, etc.). Furthermore, the user may generate the customized random data without having expertise in the creating codes to generate and transmit the random data to the external system.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts a system 100 to generate a random data in accordance with the present disclosure. The system 100 may include a user device 102, a random data generation system 104, and a plurality of external systems (including a first external system 106a, a second external system, 106b, and nth external system 106n, collectively referred to as "external system 106"), which are communicatively coupled to each other. The random data generation system 104 (or system 104) may be configured to generate random data (e.g., first random data, second random data, etc.) and transmit the generated random data to the external system 106. The system 104 may mimic the structure of real data, and may generate a plurality of different types of random data including, but not limited to, random email addresses, random names, random location addresses, random numbers, random phone numbers, random dates, and/or the like. Examples of the external system 106 include, but are not limited to, databases (e.g., MongoDB, ClickHouse, Elasticsearch), Message Queue (Kafka, Red Panda, Redis, ActiveMQ, RabbitMQ), Web Services, files (e.g., CSV, PIPE, JSON), and/or the like.

In some aspects, the system 104 may be hosted on a first server (not shown), and the external systems 106 may be hosted on a second server (not shown), which may be different from the first server. The user device 102, the system 104, and the external system 106 may be communicatively coupled via a network (not shown). The network, as described here, illustrates an example communication infrastructure in which the connected devices discussed in various embodiments of this disclosure may communicate. The network may be and/or include the Internet, a private network, public network or other configuration that operates using any one or more known communication protocols such as transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The user device 102 may be, for example, a mobile phone, a laptop, a computer, a tablet, a wearable device (e.g., a smartwatch), or any other device with communication capabilities. The user device 102 may be configured to receive user defined attributes from a user (not shown), via a user interface associated with the user device 102, which may be used by the system 104 to generate the random data. The user defined attributes may include a configuration information 108 (or a first configuration information 108) and a workload information 110 (or a first workload information 110) associated with a first workload model that may be used to plan workload and allocate resources to generate the first random data.

The first configuration information 108 may include information associated with a target integration. Stated another way, the first configuration information 108 may indicate "where" the random data (e.g., the first random data) generated by the system 104 should get transmitted to or get stored. In some aspects, the first configuration information 108 may include information such as an external system identifier, an external system Internet Protocol (IP) address, and/or the like, which may indicate whether the first random data is to be transmitted from the system 104 to the first external system 106a, the second external system, 106b, or the nth external system 106n. Specifically, the external system identifier and the external system IP address included in the first configuration information 108 may include the identifier and the IP address of the external system to which the system 104 should transmit the generated first random data.

The first workload information 110 may include information associated with the first random data to be transmitted to the external system (e.g., the first external system 106a) whose identification information is included in the first configuration information 108. In an exemplary aspect, the first workload information 110 may include data fields (or "first data fields") and/or parameters that should be included in the generated first random data. For example, the first workload information 110 may include information that indicates that the first random data should include a random first name, a random last name, a random full name, a random location address, a random number, random string from a predefined list, random integer from a predefined list, random URLs, random occupation, random emails, or a combination thereof, which should be transmitted to the first external system 106a. Further details of the first configuration information 108 and the workload information 110 are described below in conjunction with FIG. 2.

In some aspects, to enable the system 104 to generate and transmit the first random data, the user may provide/transmit user defined attributes to the system 104 via the user device 102. The system 104 may receive the user defined attributes, and may select an external system (e.g., the first external system 106a) from the plurality of external systems 106a, 106b . . . 106n based on the user defined attributes. Specifically, the system 104 may select the first external system 106a based on the first configuration information 108 provided by the user. Responsive to selecting the first external system 106a, the system 104 may integrate (or communicatively couple) with the selected external system. In further aspects, in parallel to or responsive to integrating with the selected external system, the system 104 may build a data structure (e.g., a first data structure) on the selected external system. For instance, the system 104 may build/generate tables, indexes, and queues format on the selected external system based on the first workload information 110. In alternative aspects, instead of building the first data structure directly on the selected external system, the system 104 may "enable" the selected external system to build the first data structure based on the generated tables, indexes, and queues format.

Furthermore, responsive to building the first data structure, the system 104 may transmit the first random data to the selected external system based on the first workload information 110. The system 104 may be further configured to cause the selected external system to store the first random data (including the first data fields described above) in the first data structure, which may be used by the external system for simulation and modeling, statistical modeling, training purposes, and/or the like. In additional aspects, the external system may transmit the first data structure to any other system/server (e.g., a system/server owned by a data analytics firm), which may perform the steps of simulation, modeling, training, and/or the like on the data included in the first data structure.

In some aspects, the system 104 may include a plurality of components including, but not limited to, a transceiver 112, one or more processors 114, and a memory 116, which may be communicatively coupled to each other. The transceiver 112 may be configured to transmit and/or receive information to and/or from the external systems, e.g., the user device 102, the external system 106, and/or the like. For example, the transceiver 112 may obtain the user defined attributes via the user interface associated with the user device 102. In addition, the transceiver 112 may transmit the generated first random data to the selected external system. The memory 116 may include a plurality of components including, but not limited to, a user defined attributes database 118, a data library 120, an external system information database 122, a random data generation module 124, an integration module 126, and/or the like. The modules described here may be stored in the form of computer-executable instructions, and the processor 114 may be configured and/or programmed to execute the stored computer-executable instructions for performing functions/operations in accordance with the present disclosure. The details of these modules are described later in the present disclosure.

The user defined attributes database 118 may be configured to store the user defined attributes (including the first configuration information 108 and the first workload information 110) obtained from the user via the user device 102. The data library 120 may be a collection of data (text, numbers, etc.), which may be used by the processor 114 to generate random data (including the first random data). The external system information database 122 may include information associated with the external system 106. The information associated with the external system 106 may include a list of external system identifiers, external system IP addresses, and/or the like. In further aspects, the information associated with the external system 106 may include data structure formats associated or compatible with each external system 106 such as tables, indexes, parameters associated with the indexes including unique values for a first index, a range for a second index, a relationship between the first index and the second index, etc. The first index and the second index may be used to organize the random data in the table.

The processor 114 may utilize the memory 116 to store programs in code and/or to store data for performing aspects in accordance with the disclosure. The memory 116 may be a non-transitory computer-readable storage medium or memory storing a program code that enables the processor 114 to perform operations in accordance with the present disclosure. The memory 116 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In operation, the processor 114 may obtain a user request to generate and transmit random data. In some aspects, the processor 114 may obtain the user request from the user device 102. Responsive to obtaining the request, the processor 114 may render the user interface on the user device 102 (e.g., via the transceiver 112), which may enable the user to input the user defined attributes. The user interface may include specific fields that are to be filled by the user, so that the processor 114 may accurately receive the user defined attributes from the user. Responsive to the user interface being rendered on the user device 102, the user may add or provide the user defined attributes to generate and transmit random data. As described above, the user defined attributes may include the first configuration information 108 and the first workload information 110 associated with the first workload model, which is described later below in conjunction with FIG. 2.

Responsive to the user adding the user defined attributes on the user interface, the processor 114 may obtain the user defined attributes from the user interface (via the transceiver 112, responsive to rendering the user interface on the user device 102). In some aspects, the processor obtains the user defined attributes when the user adds the user defined attributes on the user interface. Responsive to obtaining the user defined attributes, the processor 114 may store the user defined parameters in the user defined attributes database or configuration file 118. In some aspects, the configuration file may be of a flat file configuration. For example, the configuration file may be a YAML formatted configuration file.

Further, responsive to obtaining the user defined attributes, the processor 114 may determine whether the random data is to be transmitted to the first external system 106a, the second external system 106b, or the like, based on the user defined attributes (e.g., the first configuration information 108), by executing instructions stored in the integration module 126. As described above, the first configuration information 108 may include information such as the external system identifier and the external system IP address associated with the external system that may be integrated with the system 104, as per user's requirement.

Responsive to obtaining the first configuration information 108 included in the user defined attributes, the processor 114 may retrieve the information associated with the external system 106 from the external system information database 122, which may include a list of external system identifiers, external system IP addresses, etc. The processor 114 may then correlate the external system identifier and the external system IP address included in the first configuration information 108 with the retrieved list, and may determine that the random data is to be transmitted to the first external system 106a based on the correlation (e.g., when the external system identifier or the external system IP address received as part of the first configuration information 108 matches with the stored external system identifier or the external system IP address of the first external system 106a). Based on the determination described above, the processor 114 may select the first external system 106a, and may transmit a request to the first external system 106a to integrate (or communicatively couple) with the system 104 via the integration module 126, to enable/configure the first external system 106a to receive the random data generated by the system 104.

In further aspects, the processor 114 may generate the random data (e.g., the first random data) based on the user defined attributes, by using the instructions stored in the random data generation module 124. For instance, the processor 114 may generate the first random data based on the first workload information 110 included in the user defined attributes, which may include the user's requirements to generate the first random data. As described above, the first workload information 110 may include data fields (or first data fields) and/or parameters associated with the first random data that the user desires the system 104 to generate, such as a random first name, a random last name, a random full name, a random location address, a random number (e.g., in a user defined range and format), or a combination thereof, which may be used to generate the first random data for the first workload model. In further aspects, the processor 114 may generate the first random data based on the first configuration information 108.

In some aspects, to generate the first random data, the processor 114 may use the data library 120. For example, when the first workload information 110 indicates that the user desires to generate random full names, the processor 114 may fetch random first names and random last names from the data library 120, and may generate full names randomly from the fetched first names and last names. In some aspects, the data library 120 may be hosted on another server (different from the server on which the system 104 is hosted), and the processor 114 may fetch the data library 120 from the other server, via the transceiver 112, and may generate the first random data based on the fetched data library. In other aspects, the data library 120 may be hosted on the same server that host the system 104.

Responsive to generating the first random data, the processor 114 may transmit the first random data to the first external system 106a based on the user defined attributes. In further aspects, the processor 114 may create or build a first data structure on the first external system 106a to store the generated first random data in the first external system 106a. The processor 114 may build the first data structure based on the first data fields indicated in the first workload information 110, and may cause the first external system 106a to store the first random data in the first data structure. The processor 114 may build the first data structure by creating tables, indexes, and queues definitions in the first external system 106a. In further aspects, the processor 114 may build the first data structure based on the information stored in the external system information database 122. Thus, the processor 114 (or the system 104) may automatically build the data structure (e.g., table, indexes, etc.) on the first external system 106a to store the first random data, and the user may not have to manually build such data structures on the first external system 106a to integrate the first external system 106a with the system 104.

In some aspects, to perform/execute the steps described above, the processor 114 may implement threading operations. In an exemplary aspect, the system 104 may perform multi-threading or use multiple-threads based on a count of CPUs (e.g., the processors 114) the system 104 may have. In some aspects, the user defined attributes (or the first workload information 110) may include workload threads parameter, which may be used to implement one or more threads to execute the steps described above (including the steps of generating random data, transmitting the random data, building the data structure, etc.) to execute multiple processes simultaneously. Stated another way, the system 104 may implement threading operations based on the user's requirement and based on the count of CPUs the system 104 may have.

Figure 2:
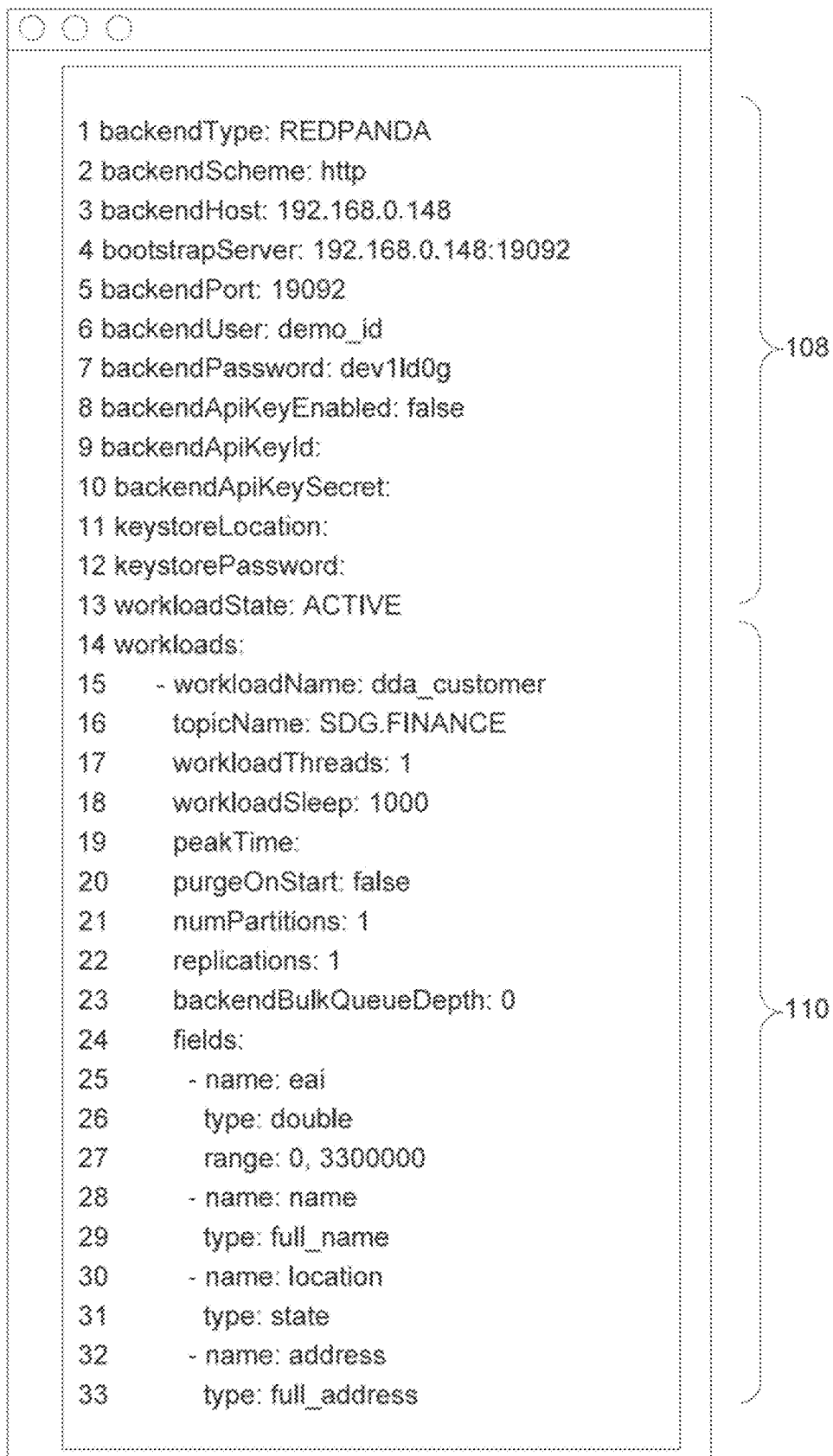
FIG. 2 depicts an example first configuration information and first workload information in accordance with the present disclosure.

FIG. 2 depicts an example snapshot showing the first configuration information 108 and the first workload information 110 in accordance with the present disclosure.

As described above, the first configuration information 108 may include information associated with a target integration (including the external system identifier and the external system IP address). As an example, the user may provide "RedPanda" as the external system identifier (under a tag "backendType", shown in FIG. 2). The user may further provide the external system IP address associated with "Red Panda" under the tag "backendHost". The user may further add additional information in the first configuration information 108 including, but not limited to, "backendScheme" (e.g., http, https, TCP, etc.), bootstrap server, "backendPort" associated with the first external system 106a (that may be used by the first external system 106a to receive the random data from the system 104), etc.

The first configuration information 108 may further include authentication information to authenticate against the first external system 106a. The authentication information may be used to verify the identity of the user, devices, and/or processes to granted access to the resources in the first external system 106a. For example, the user may add the authentication information under the tags "backendUser" and "backendPassword" to authenticate against the first external system 106a (or "RedPanda").

In addition, the first configuration information 108 may include information associated with a system Application Programming Interface (API) that may be used to transmit the first random data to the first external system 106a. The user may enable or disable the API key by using the tag "backendApiKeyEnabled". In instances where the user desires to enable the API key, the user may provide the authentication information to validate the API against the first external system 106a by using the tags "backendApiKeyId", "backendApiKeySecret", etc. Similarly, when the user desires to use Transport Layer Security (TLS) communication to communicate with the first external system 106a, the user may use tags "KeystoreLocation", "KeystorePassword", etc.

In further aspects, the first workload information 110 associated with the first workload model may include information associated with the first random data that is to be transmitted to the external system, as described above. In some aspects, the first workload information 110 may include a workload identifier. The user may provide the workload identifier under a tag "workloadName" and/or a "topicName", as shown in FIG. 2. For example, the user may provide the "workloadName" as "dda_customer" and the "topicName" as "SDG.FINANCE".

In further aspects, the first workload information 110 may include information associated with the workload threads to execute the first workload model. The user may provide details of a count of threads under the tag "workloadThreads" that the user may desire to use to execute different steps described above in conjunction with FIG. 1. When the user selects one thread to execute the first workload model, there may be one program counter and one sequence of instructions. On the other hand, when the user selects multiple threads (e.g., two or more) for the first workload model, there may be multiple program counters (one for each thread), stack and set of registers, but sharing a common code, data, and certain structures. The processor 114 may be configured to perform multi-threading to execute the workload threads simultaneously.

In further aspects, the first workload information 110 may include information associated with a frequency at which the system 104 should transmit the first random data to the first external system 106a. The user may add the frequency information under the tag "workloadSleep" in seconds or milliseconds (as an example). For example, the user may desire to transmit the first random data every 1,000 milliseconds to the first external system 106a, as shown in FIG. 2. In this manner, the user may control the delivery from the system 104 to the first external system 106a. By using the "workloadSleep" parameter, the user may control the time duration for which the transmission of the first random data from the system 104 to the first external system 106a may be paused. In the example described above, the processor 114 pauses for 1 second between two transmissions.

In further aspects, the system 104 may enable the user to define or indicate if the user desires to "fluctuate" the frequency at which the first random data is transmitted to the first external system 106a during specific times of the day. For example, the user may define that the first random data should be transmitted to the first external system 106a at double frequency between 4 PM to 8 PM on a day, as compared to other times of the day. In this case, the first workload information 110 that the user provides to the system 104 may include information associated with a first frequency at which the first random data is to be transmitted during "peak" time duration and a second frequency at which the first random data is to be transmitted during "non-peak" time duration. The user may add such information under the tag "peakTime" in a 24-hour time date stamp. The processor 114 may treat this time as the peak time and may ramp up or ramp down the frequency (mentioned in the "workloadSleep" parameter) of random data delivery. For example, the processor 114 may transmit the first random data to the first external system 106a every 0.5 seconds (as the first frequency) during the peak time duration indicated by the user, and every 1.5 seconds (as the second frequency) during the non-peak time duration. The first frequency may be greater than the second frequency. In some aspects, the first frequency and the second frequency may be indicated by the user as a part of the first workload information 110.

In further aspects, the system 104 may enable the user to define or indicate a count of random data entries that the system 104 should send in a "burst" simultaneously. In this case, the first workload information 110 that the user provides to the system 104 may include a count of random data that is to be transmitted to the first external system 106a together or simultaneously at an instance or at the same time. Responsive to receiving such information from the user, the system 104 may queue the count of random data, and transmit the queue together at the same time to the first external system 106a. The user may indicate such count in the first workload information 110 under the tag "backendBulkQueueDepth". For example, when the user provides the count as 10, the processor 114 may queue a list of 10 random names and transmit the list of the 10 random names (as a first batch) together at the same time or in a single "burst" to the first external system 106a. Similarly, the processor 114 may queue the next list of 10 random names and transmit the next 10 random names (as a second batch) together at the same time, and so on. The user may define/select the batch size by using the "backendBulkQueueDepth" parameter.

The first workload information 110 may further include an indication to purge data at a specific instance. For example, the user may desire to purge historical random data at the first external system 106a at a start time of the first workload model, and may provide such indication under the tag "purgeOnStart" in the first workload information 110. The first workload information 110 may further include tags such as "numPartitions", "replicationFactor", etc. In further aspects, the first workload information 110 may include the data fields described above under the tag "fields", shown in FIG. 2.

In some aspects, the processor 114 may obtain the first configuration information 108 and the first workload information 110 from the user device 102 as part of the user defined attributes (via the transceiver 112) when the user provides the user defined attributes on the user interface rendered on the user device 102. The processor 114 may then generate the first random data based on the user defined attributes, as described above in conjunction with FIG. 1. Responsive to generating the first random data, the processor 114 may transmit the generated random data to the first external system 106a, via the transceiver 112, based on the parameters included in the first workload information 110.

In further aspects, the processor 114 may build a data structure (e.g., a first data structure) on the selected external system (e.g., the first external system 106a). For instance, the processor 114 may build tables, indexes, and queue definitions on the first external system 106a based on the first workload information 110. In some aspects, responsive to building the first data structure, the processor 114 may transmit the first random data to the first external system 106a based on the first workload information 110. The processor 114 may be further configured to cause the first external system 106a to store the first random data (including the first data fields) in the first data structure. A snapshot 300 of the first random data received by the first external system 106a is shown in FIG. 3.

In an exemplary aspect, the snapshot 300 depicts the interface of the first external system 106a (e.g., "RedPanda") showing the "topicName" as "SDG.FINANCE", as visible in a view 302 of FIG. 3. The snapshot 300 further depicts additional information associated with the received first random data, such as a count of random data or messages received in real-time, size of the received data in real-time, data deletion policy (e.g., associated with the information provided by the user under the tag "purgeOnStart"), as shown in a view 304. The snapshot 300 further depicts the received first random data in the first data structure (including tables, indexes etc.), as shown in a view 306. The view 306 shows the first data fields that may be provided by the user in the first workload information 110 including the random name, the random location, the random address, and/or the like.

FIG. 4 depicts the first workload information 110, and an example second workload information 400 that the user may provide to the system 104 simultaneously with the first workload information 110. The first workload information 110 may be associated with the first workload model described above, and the second workload information 400 may be associated with a second workload model that the user may desire to implement along with or in addition to the first workload model.

In some aspects, the processor 114 may be configured to obtain the second workload information 400 from the user device 102, as part of the user defined attributes. The second workload information 400 associated with the second workload model may include information associated with a second random data that the user desires the system 104 to transmit to the external system (e.g., the first external system 106*a*). The second random data may be different from the first random data. For example, the second random data may have different fields, different workloadsleep time duration, and/or the like, than the first random data.

In some aspects, the parameters provided in the first workload information 110 by the user may be different from the parameters provided in the second workload information 400. For example, the first workload information may include the first data fields (e.g., random names and addresses), and the second workload information may include second data fields (e.g., random numbers in a specific range and format) to be transmitted to the first external system 106*a*. Thus, the user may add two (or more) workload information that may be implemented or executed simultaneously to generate and transmit different random data to the first external system 106*a* simultaneously.

In some aspects, the second workload information 400 may include a second workload identifier. The user may provide the second workload identifier under a tag "workloadName" and/or a "topicName", as shown in FIG. 4. For example, the user may provide the "workloadName" as "dda_customer2" and the "topicName" as "SDG.FINANCE2". The user may further provide details of a count of threads under the tag "workloadThreads". The user may additionally provide details of other parameters under the "workloadThreads", the the "workloadSleep", the "peakTime", the "backendBulkQueueDepth", "purgeOnStart" etc., for the second workload model, in a similar manner as the first workload model as described above. The user may add the second field under the tag "fields", which may be used by the processor 114 to generate the second random data. The details for these parameters are described above in conjunction with FIG. 2.

The processor 114 may be configured to obtain the second workload information 400 (via the transceiver 112) from the user device 102, generate the second random data based on the second workload information 400, and transmit the second random data to the first external system 106*a* based on the second workload information 400 and the first configuration information 108, in the similar manner as described above. In some aspects, the user may not be required to add the configuration information for the first external system 106*a* again to implement or execute the second workload model simultaneously with the first workload model. The user may simply add the parameters associated with the second workload model (part of the second workload information 400) to the parameters associated with the first workload model (part of the first workload information 110) to implement multiple workloads simultaneously for the first external system 106*a*. In some aspects, the processor 114 may generate the second random data based on the second data fields included in the second workload information 400 described above.

In further aspects, the processor 114 may build a second data structure (like the first data structure) on the first external system 106*a* based on one or more second data fields, and cause the first external system 106*a* to store the second random data in the second data structure. The second data structure may be different from the first data structure (as the first fields may be different from the second fields). In some aspects, the processor 114 may be configured to cause the first external system 106*a* to store the first random data and the second random data simultaneously in the first and second data structures respectively. A snapshot 500 of the first and second random data received by the first external system 106*a* is shown in FIG. 5.

The snapshot 500 depicts the interface of the first external system 106*a* in which two workload models are indicated. Specifically, the snapshot 500 depicts the "topicName" for the first workload model as "SDG.FINANCE", and the "topicName" for the second workload model as "SDG.FINANCE2", shown in a view 502 of FIG. 5. The user may click on the "topicName" for the first workload model or the second workload model to view the details of the respective workload model. When the user clicks on the "topicName" for the first workload model, the user may see an interface shown in FIG. 3 (with the real-time information of the received first random number). When the user clicks on the "topicName" for the second workload model, the user may see real-time information of the received second random number (similar to the information shown in FIG. 3).

In additional aspects, the transceiver 112 may be configured to obtain a second configuration information from the user via the user device 102, when the user desires to transmit the random data (e.g., the first random data or the second random data) to another external system (e.g., second external system 106*b*) different from the first external system 106*a*. The second configuration information may include information associated with the second external system 106*b*. The processor 114 may be configured to obtain the second configuration information from the transceiver 112 and may generate and transmit the random data to the second external system 106*b* based on the second configuration information. In such cases, the user may or may not change the first workload information 110 (or the second workload information 400). Stated another way, the user may simply replace the first configuration information with the second configuration information without updating the first workload information 110 (and/or the second workload information 400). In some aspects, the user may update the first workload information 110 (or the second workload information 400) with a third workload information when the user desires to generate/transmit third random data (e.g., random first names only) to the second external system 106*b*.

Figure 6:
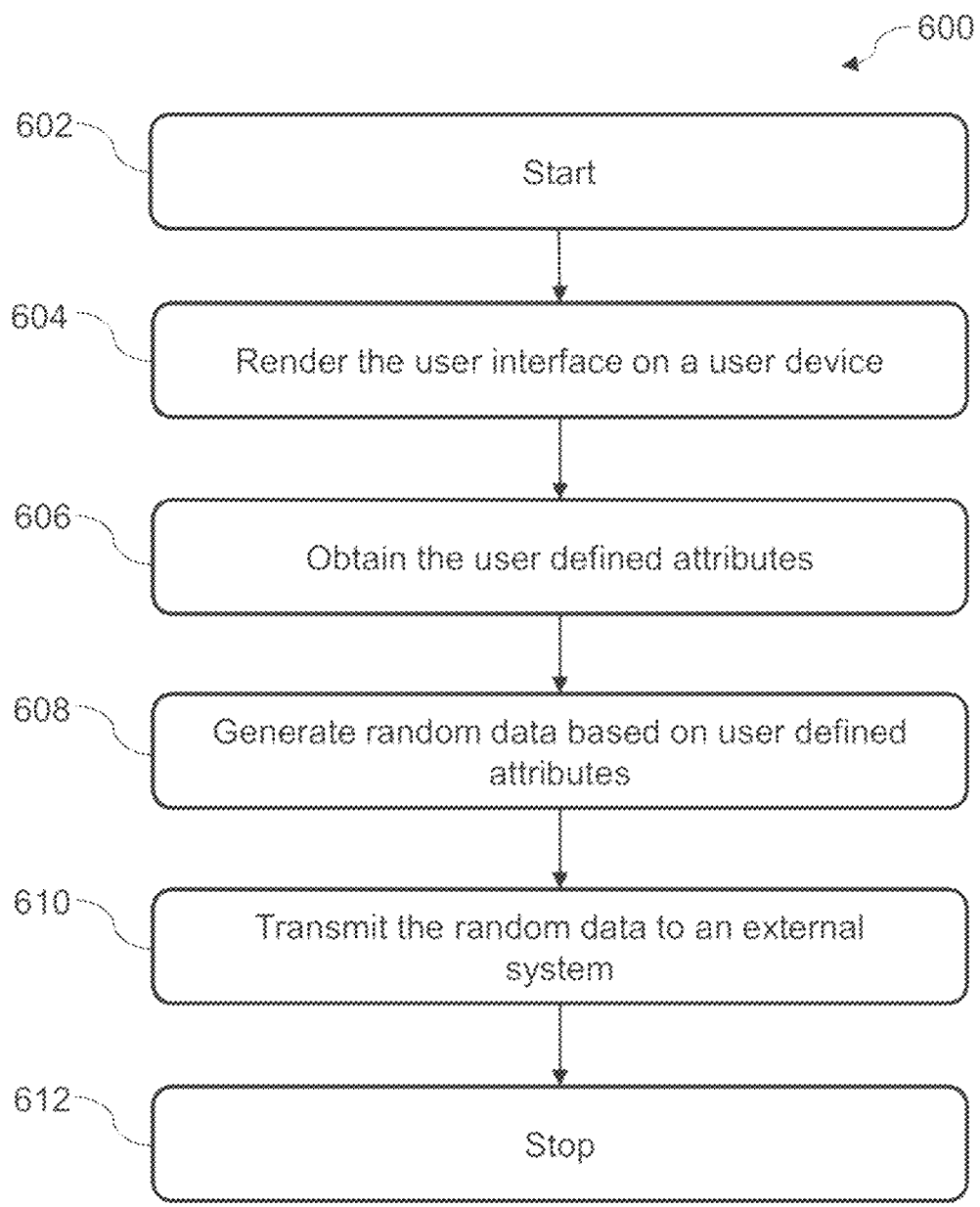
FIG. 6 depicts a flow diagram of an example random data generation method in accordance with the present disclosure.

FIG. 6 depicts a flow diagram of an example random data generation method 600 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include rendering, by the processor 114, the user interface on the user device 102. At step 606, the method 600 may include obtaining, by the processor 114, the user defined attributes from the user device 102 responsive to rendering the user interface. As described above, the user defined attributes may include the first configuration information 108 and the first workload information 110 associated with the first workload model. The first configuration information 108 may include information associated with the external system 106 (e.g., the first external system 106*a*). The first workload information 110 may include information associated with the first random data to be transmitted to the first external system 106*a*. In some aspects, the first workload information 110 may include information associated with the first frequency at which the first random data is to be transmitted during the peak time duration and the second frequency at which the random data is to be transmitted during the non-peak time duration.

At step 608, the method 600 may include generating, by the processor 114, the first random data based on the user defined attributes. At step 610, the method 600 may include transmitting, by the processor 114, the first random data to the external system 106 (e.g., the first external system 106a).

At step 612, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A random data generation system comprising:
    a transceiver configured to receive user defined attributes via a user interface of a user device, wherein the user defined attributes comprise a first configuration information and a first workload information associated with a first workload model, wherein:
        the first configuration information comprises information associated with a first external system,
        the first workload information comprises information associated with a first random data to be transmitted to the first external system, and
        the first workload information further comprises information associated with a first frequency at which the first random data is to be transmitted during peak time duration and a second frequency at which the first random data is to be transmitted during non-peak time duration; and
    a processor communicatively coupled to the transceiver, wherein the processor is configured to:
        render the user interface on the user device;
        obtain the user defined attributes from the user device via the transceiver, responsive to rendering the user interface;
        generate the first random data associated with the first workload model based on the user defined attributes; and
        transmit the first random data to the first external system based on the user defined attributes.

2. The random data generation system of claim 1, wherein the first frequency is greater than the second frequency.

3. The random data generation system of claim 1, wherein the first configuration information comprises a first external system identifier and a first external system Internet Protocol (IP) address.

4. The random data generation system of claim 1, wherein the first configuration information comprises authentication information to authenticate against the first external system.

5. The random data generation system of claim 1, wherein the information associated with the first random data comprises one or more first data fields to be transmitted to the first external system, wherein the processor generates the first random data based on the one or more first data fields, and wherein the one or more first data fields comprise one or more of: a random first name, a random last name, a random full name, a random location address, or a random number in a user defined range and format.

6. The random data generation system of claim 5, wherein the processor is further configured to:

build a first data structure on the first external system based on the one or more first data fields; and cause the first external system to store the first random data in the first data structure.

7. The random data generation system of claim 6, wherein to build the first data structure, the processor is configured to create one or more of: tables, indexes, and queue definitions, and wherein the processor builds the first data structure based on the tables, indexes and the queues format.

8. The random data generation system of claim 1, wherein the first workload information further comprises a count of random data that is to be transmitted to the first external system together at a same time.

9. The random data generation system of claim 1, wherein the first workload information further comprises an indication to purge historical random data at a user defined time.

10. The random data generation system of claim 1, wherein the first workload information further comprises a first workload identifier, and wherein the first workload identifier comprises at least one of a workload name or a topic name.

11. The random data generation system of claim 1, wherein the processor is further configured to execute one or more workload threads simultaneously to execute the first workload model.

12. The random data generation system of claim 6, wherein the transceiver is further configured to receive a second workload information associated with a second workload model via the user interface, wherein the second workload information comprises information associated with a second random data to be transmitted to the first external system, and wherein the second random data is different from the first random data.

13. The random data generation system of claim 12, wherein the processor is further configured to:

generate the second random data associated with the second workload model based on the second workload information; and transmit the second random data to the first external system based on the second workload information and the first configuration information.

14. The random data generation system of claim 13, wherein the information associated with second random data comprises one or more second data fields to be transmitted to the first external system, wherein the processor is configured to generate the second random data based on the one or more second data fields.

15. The random data generation system of claim 14, wherein the processor is further configured to:

build a second data structure on the first external system based on the one or more second data fields; and cause the first external system to store the second random data in the second data structure.

16. The random data generation system of claim 15, wherein the second data structure is different from the first data structure.

17. The random data generation system of claim 15, wherein the processor is further configured to cause the first external system to store the first random data and the second random data simultaneously.

18. The random data generation system of claim 1, wherein the transceiver is further configured to receive a second configuration information associated with a second external system, and wherein the processor is configured to transmit the first random data to the second external system based on the second configuration information.

19. A method comprising:

rendering, by a processor, a user interface on a user device;

obtaining, by the processor, user defined attributes from the user device, responsive to rendering the user interface, wherein:

the user defined attributes comprise a configuration information and a workload information associated with a workload model, the configuration information comprises information associated with an external system, the workload information comprises information associated with a random data to be transmitted to the external system, and the workload information further comprises information associated with a first frequency at which the random data is to be transmitted during peak time duration and a second frequency at which the random data is to be transmitted during non-peak time duration;

generating, by the processor, the random data associated with the workload model based on the user defined attributes; and transmitting, by the processor, the random data to the external system based on the user defined attributes.

20. A non-transitory computer-readable storage medium having instructions stored thereupon which, when executed by a processor, cause the processor to:

render a user interface on a user device;

obtain user defined attributes from the user device, responsive to rendering the user interface, wherein:

the user defined attributes comprise a configuration information and a workload information associated with a workload model, the configuration information comprises information associated with an external system, the workload information comprises information associated with a random data to be transmitted to the external system, and the workload information further comprises information associated with a first frequency at which the random data is to be transmitted during peak time duration and a second frequency at which the random data is to be transmitted during non-peak time duration;

generate the random data associated with the workload model based on the user defined attributes; and transmit the random data to the external system based on the user defined attributes.

* * * * *